(12) United States Patent
Gupta

(10) Patent No.: US 11,704,718 B2
(45) Date of Patent: Jul. 18, 2023

(54) CONCURRENT BROWSING INTERFACE

(71) Applicant: eBay Inc., San Jose, CA (US)

(72) Inventor: Neeraj Gupta, Milpitas, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/875,718

(22) Filed: Jul. 28, 2022

(65) Prior Publication Data

US 2022/0366477 A1 Nov. 17, 2022

Related U.S. Application Data

(63) Continuation of application No. 16/999,286, filed on Aug. 21, 2020, now Pat. No. 11,436,658.

(51) Int. Cl.
*G06Q 30/00* (2023.01)
*G06Q 30/0601* (2023.01)
*G06F 16/9535* (2019.01)
*G06F 16/9538* (2019.01)
*G06Q 10/0834* (2023.01)
*H04L 65/1069* (2022.01)
(Continued)

(52) U.S. Cl.
CPC ..... *G06Q 30/0631* (2013.01); *G06F 16/9535* (2019.01); *G06F 16/9538* (2019.01); *G06F 40/169* (2020.01); *G06Q 10/08345* (2013.01); *G06Q 20/12* (2013.01); *G06Q 30/0222* (2013.01); *G06Q 30/0629* (2013.01); *G06Q 30/0633* (2013.01); *G06Q 30/0641* (2013.01); *H04L 65/1069* (2013.01)

(58) Field of Classification Search
CPC . G06Q 20/12; G06Q 30/0222; G06Q 30/0641
See application file for complete search history.

(56) References Cited

U.S. PATENT DOCUMENTS 7,149,776 B1 * 12/2006 Roy ............... G06F 16/954
715/239
7,219,072 B1 * 5/2007 Sundaresan ........ G06Q 30/0641
705/26.42

(Continued)

OTHER PUBLICATIONS

Kumar, Bhaskar, et al. "Implementation of Interactive Real Time Online Co-Shopping using Push AJAX." IMCIP—2016. Science Direct, Procedia Computer Science 89, pp. 473-482, 2016. (Year: 2016).*

(Continued)

*Primary Examiner* — Luis A Brown
(74) *Attorney, Agent, or Firm* — Shook, Hardy & Bacon LLP

(57) ABSTRACT

Methods, systems, and computer storage media provide a concurrent browsing session. A user interface is provided for display on a first computing device of a first user to facilitate the concurrent browsing session. The user interface simultaneously displays a first browsing screen showing interaction of the first user with a site and a real-time feed of a second browsing screen presented on a second computing device of a second user showing interaction of the second user with the site. A request is received to split payment of a first item in a first digital cart. In response to the request, a first payment interface for a first portion of the payment is provided for display on the first computing device, and a second payment interface for a second portion of the payment is provided for display on the second computing device.

14 Claims, 5 Drawing Sheets

(51) Int. Cl.
  *G06Q 20/12* (2012.01)
  *G06F 40/169* (2020.01)
  *G06Q 30/0207* (2023.01)

(56) References Cited

U.S. PATENT DOCUMENTS

| | | | | |
|---|---|---|---|---|
| 8,806,655 | B1* | 8/2014 | Brownell | G06F 21/53 |
| | | | | 707/723 |
| 9,122,758 | B1* | 9/2015 | Blower | G06F 16/9535 |
| 9,171,087 | B2* | 10/2015 | Pirnazar | H04L 67/02 |
| 9,305,084 | B1* | 4/2016 | McCann | G06F 16/954 |
| 9,361,583 | B1* | 6/2016 | Holloway | G06F 16/9537 |
| 9,489,353 | B2* | 11/2016 | Pirnazar | H04L 67/141 |
| 9,990,621 | B1* | 6/2018 | Ng | G06Q 20/42 |
| 10,291,722 | B1* | 5/2019 | Mendez | H04L 63/20 |
| 10,296,962 | B2* | 5/2019 | Abraham | G06Q 30/06 |
| 10,410,194 | B1* | 9/2019 | Grassadonia | G06Q 20/327 |
| 10,705,690 | B1* | 7/2020 | Mehta | G06F 3/0484 |
| 11,361,298 | B2* | 6/2022 | Sivaraman | G06Q 20/22 |
| 11,436,658 | B2 | 9/2022 | Gupta | |
| 2003/0225836 | A1* | 12/2003 | Lee | H04L 67/02 |
| | | | | 709/205 |
| 2004/0172267 | A1* | 9/2004 | Patel | G06Q 30/02 |
| | | | | 705/26.7 |
| 2006/0195325 | A1* | 8/2006 | Tateson | G06F 16/9032 |
| | | | | 707/E17.136 |
| 2007/0078835 | A1* | 4/2007 | Donnelli | G06Q 30/02 |
| 2011/0119352 | A1* | 5/2011 | Perov | G06F 16/954 |
| | | | | 709/218 |
| 2011/0173102 | A1* | 7/2011 | Burns | H04N 21/47815 |
| | | | | 705/26.7 |
| 2012/0047449 | A1* | 2/2012 | Burckart | G06F 16/957 |
| | | | | 715/753 |
| 2013/0218966 | A1* | 8/2013 | Jakobson | G06Q 30/0241 |
| | | | | 709/204 |
| 2014/0019534 | A1* | 1/2014 | Handrigan | G06F 16/00 |
| | | | | 709/204 |
| 2014/0033049 | A1* | 1/2014 | Fitzpatrick | G06F 16/954 |
| | | | | 715/733 |
| 2014/0098176 | A1* | 4/2014 | Isaacs | H04L 65/4025 |
| | | | | 348/14.01 |
| 2014/0164934 | A1* | 6/2014 | Yang | G06Q 50/01 |
| | | | | 715/738 |
| 2014/0180871 | A1* | 6/2014 | Mignano | G06Q 30/0613 |
| | | | | 705/26.41 |
| 2014/0214592 | A1* | 7/2014 | He | G06Q 30/00 |
| | | | | 705/26.7 |
| 2014/0297337 | A1* | 10/2014 | Geraci | G06Q 30/0631 |
| | | | | 705/5 |
| 2014/0351082 | A1* | 11/2014 | Lowinger | G06Q 30/0633 |
| | | | | 705/26.8 |
| 2015/0106366 | A1* | 4/2015 | Stuttle | G06F 16/90324 |
| | | | | 707/732 |
| 2015/0110457 | A1* | 4/2015 | Abecassis | H04N 21/4394 |
| | | | | 386/201 |
| 2016/0072858 | A1* | 3/2016 | Heyne | H04L 67/025 |
| | | | | 715/753 |
| 2016/0117758 | A1* | 4/2016 | Bleakley | G06Q 30/0643 |
| | | | | 705/26.9 |
| 2016/0171570 | A1* | 6/2016 | Dogin | G06Q 30/0633 |
| | | | | 705/26.2 |
| 2017/0039270 | A1* | 2/2017 | Bolshinsky | G06F 16/9535 |
| 2017/0185368 | A1* | 6/2017 | Handrigan | G06F 16/9038 |
| 2017/0195374 | A1* | 7/2017 | Vu | H04W 4/70 |
| 2017/0228774 | A1* | 8/2017 | Sallas | G06Q 30/0255 |
| 2018/0300787 | A1* | 10/2018 | Patterson | G06Q 30/0277 |
| 2019/0340658 | A1* | 11/2019 | Udupa | G06Q 30/0281 |
| 2019/0347704 | A1* | 11/2019 | Stamboni | G06Q 30/0639 |
| 2020/0074524 | A1* | 3/2020 | Smith | G06Q 10/083 |
| 2020/0265409 | A1* | 8/2020 | Babu | G06N 20/00 |
| 2021/0035585 | A1* | 2/2021 | Gupta | G10L 15/25 |
| 2021/0150574 | A1* | 5/2021 | Gross | H04L 67/306 |
| 2022/0058712 | A1 | 2/2022 | Gupta | |

OTHER PUBLICATIONS

Kumar, Bhashkar, et al. "Implementation of Interactive Real Time Online Co-Shopping using Push AJAX." Procedia Computer Science 89 (2016), pp. 473-482. (Year: 2016).*

EBAY, "Fidget Spinner", Retrieved from the Internet URL :<https://www.ebay.com/sch/i.html?_from=R40&_nkw=fidget+spinner&_sacat=0&rt=nc&LH_BIN=1>, Accessed on Nov. 15, 2021, 18 pages.

Kumar et al., "Implementation of Interactive Real Time Online Co-Shopping using Push AJAX", Procedia Computer Science, vol. 89, 2016, pp. 473-482.

* cited by examiner

CONCURRENT BROWSING INTERFACE

CROSS-REFERENCE TO RELATED APPLICATIONS

This patent application is a continuation of U.S. patent application Ser. No. 16/999,286, filed Aug. 21, 2020, which is herein incorporated by reference in its entirety for all purposes.

BACKGROUND

Conventional online marketplaces provide a shopping experience tailored to an individual user by providing an interface that allows a user to browse through inventory with recommendations for products to purchase. The recommendations are often based on information about the user, such as the user's browsing activity or historical purchase history. The user, however, is provided with a singular shopping experience that does not allow for the real-time participation of other users. Any time the user seeks to solicit feedback from other users, the user is forced to browse for items (or products), identify items of interest, determine a way to describe the items (e.g., via hyperlink, screenshots, or text descriptions), and communicate the item descriptions to others. This roundabout way of sharing items of interest with other users adds to the time it takes a user to browse through items, adds to network traffic, exhausts virtual resources, and decreases available internet and telephone bandwidth.

SUMMARY

At a high level, aspects described herein relate to providing a concurrent browsing interface with recommendations, annotations, and scores for multiple users. By providing a concurrent browsing interface, the browsing activities of each user are simultaneously visible to all of the other participating users. Likewise, the technology described herein also provides recommendations to the users based on the attributes of all participating users.

When a user requests a concurrent browsing session, the real-time live feeds of users' browsing screens are received to generate a concurrent browsing interface. The concurrent browsing interface simultaneously displays each user's browsing screen and browsing activity to all other participating users.

User attributes for each user are retrieved. The user attributes of all participating users are used to generate scores for items being browsed by each participating user. The scores may also be manually input by the participating users. The scores for browsed items are integrated into the concurrent browsing interface, so that each participating user may view the scores on the interface. The scores are displayed in the vicinity of the items that they correspond to.

As users provide user input, the user input is processed. Annotations, provided as user input, are incorporated into the concurrent browsing interface in the same region as the items they relate to. The annotations are integrated into the browsing screen that they were placed on. Each participating user may view the annotations submitted by any other participating user.

Payment information from the participating users is received in response to navigation to pages relating to payment. The payment information is incorporated into the concurrent browsing interface to provide a shared payment interface. Each participating user may view the digital cart, which includes items selected for purchase, of every other participating user. Sensitive financial information, however, may be obfuscated or omitted for those users that the information does not relate to.

Recommendations are generated based on the scores, annotations, payment information, and user attributes of the participating users. Using these factors, the recommendation engine generates suggestions including, but not limited to, which items to purchase, which users should purchase each item, and how many items the users should purchase. The recommendations are integrated into the concurrent browsing interface in the relative vicinity of associated items they apply to. As additional user input is received, the recommendations, annotations, scores, and payment information are used to generate an updated concurrent browsing interface.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
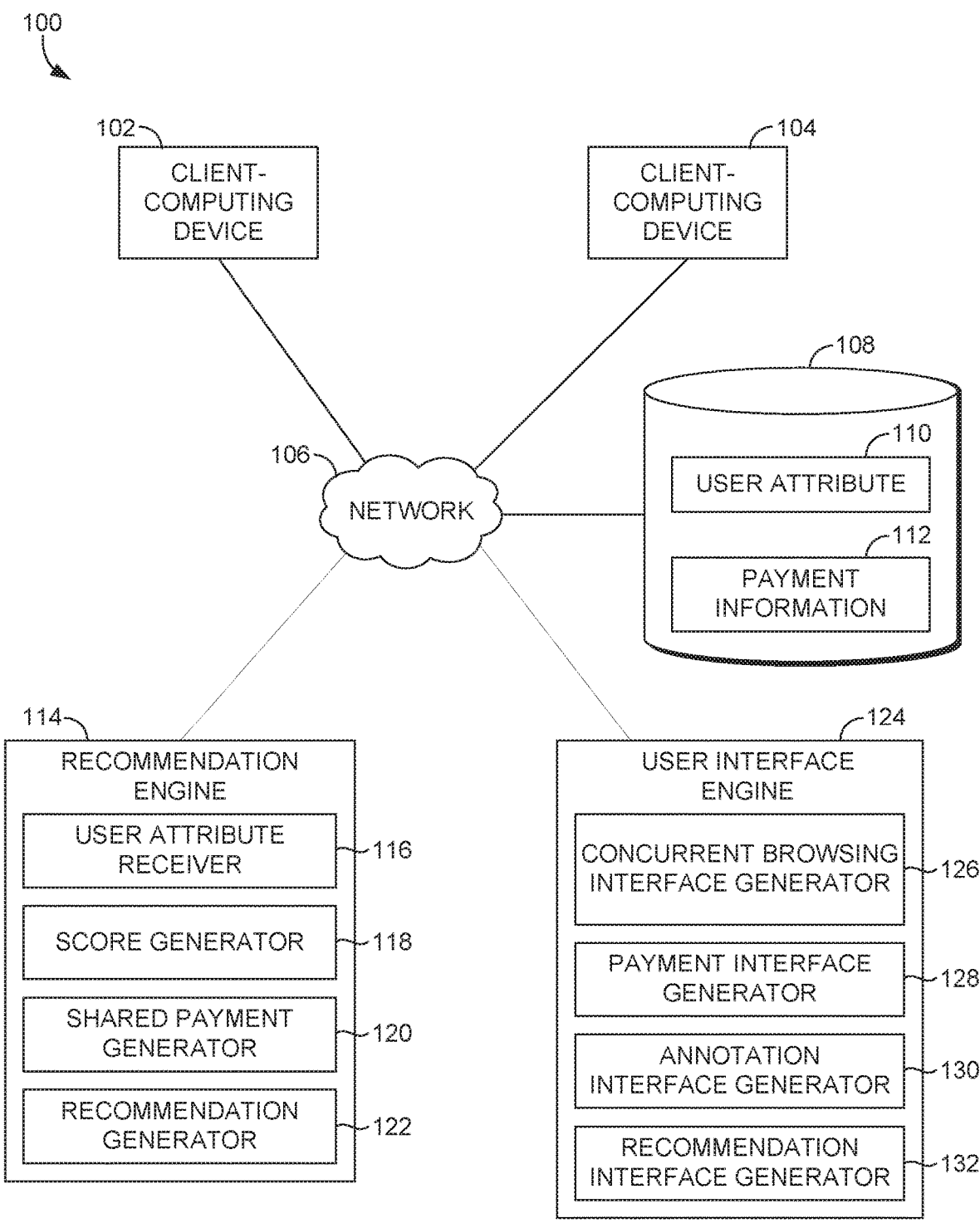
FIG. 1 is an example concurrent browsing system in which implementations of the present disclosure may be employed.

As described above, conventional online marketplaces provide an interface that caters to a single user. Despite the collaborative nature of shopping in-person, conventional online marketplaces continue to provide interfaces that are tailored to an individual user. The interface may provide a single browsing session with only the browsing activity of the user visible. Current online marketplaces also provide sponsored or suggested products for purchase that are based on the user attributes of the individual user. In this case, "user attributes" may be any piece of information that represents the user. With users increasingly seeking to solicit feedback from others, the user must identify any items of interest and formulate another way to communicate the items to other users (e.g., via hyperlink, screenshots, text descriptions). As online marketplaces grow in size of inventory, the number of items that a user may want to discuss and share with other users continues to grow. Thus, it becomes more and more important to provide an interface that allows users to collaborate with other users, receive feedback on browsed items from those users, and generate recommendations that caters to the entire group of users versus an individual user.

The problem, however, is that current online marketplaces use recommendation systems that utilize user attributes from a single user to generate recommendations, even though the attributes of other users (who would have been requested to provide feedback) may more accurately predict which items are ultimately purchased. As the sheer amount of online marketplaces (and the items they sell) grows, these traditional recommendation systems begin to provide a user with recommendations that are relevant only to the user attributes of an individual user, while recommendations that are more relevant to user attributes from a group of users (that exert influence over a user's selections) may not even be generated. To compensate, users are forced to employ a variety of ways to share items of interest with others in order to solicit feedback such as sending screenshots of the item, emailing and texting hyperlinks to the item listing, and providing a text description of the item, while communications systems are forced to store and transmit more information than necessary to enable sharing. This leads to many of the problems previously discussed, such as increasing network traffic, increasing the amount of virtual resources used, and decreasing internet and phone bandwidth.

Embodiments of the technology disclosed herein relate to a recommendation engine and user interface engine that solves these challenges by customizing recommendations to a group of users using a concurrent browsing interface. Based on the user attributes of each participating user in the concurrent browsing session, the recommendation engine generates recommendations, such as items to purchase, which users should purchase an item, and the quantity of items to purchase to obtain a discount. The user interface engine generates a concurrent browsing interface that is associated with a group of users, configured to track browsing activity of each user, and provide an interface that simultaneously displays real-time live feeds of each participating user's browsing activity to all the users. In other words, each participating user is simultaneously able to view the browsing screens and activity, as a real-time feed, of all of the participating users along with any annotations, scores, and recommendations.

When the user interface engine receives a request to initiate a concurrent browsing session, the real-time live feeds of each participating user's browsing screen are received. The request to initiate a concurrent browsing session may specify a purpose for conducting the session, such as to shop for outfits for an upcoming event. In response to the request to initiate a concurrent browsing session, the user interface engine may provide for display a listing of items, such as search results to a search query (or search terms), for each user to browse through inventory. As each user browses through the generated listing of items, all of the users are able to simultaneously view the real-time feeds of each other's browsing activities. The user interface engine may also generate payment interfaces to facilitate shared payment between the participating users.

As the users browse through the concurrent browsing interface, the recommendation engine receives user attributes, such as location, of each user participating in the concurrent browsing session. The recommendation engine may also receive the purpose of the session that was included in the request to initiate a concurrent browsing session.

As the concurrent browsing interface receives user input from each of the participating users, the user input is processed. In this way, the user interface engine determines how to handle different forms of user input. For instance, in response to scores and annotations, the user interface engine may determine such user input affects user attributes (and, in turn, recommendations) and route the user input to the recommendation engine for handling. In some aspects, a user's request for a shared payment interface may be routed to the recommendation engine to gather relevant payment information. The payment information may then be used to generate a payment interface using the user interface engine.

The recommendation engine may then take user attributes and routed annotations and scores into account when generating recommendations. The recommendations are based on the user attributes of all of the participating users in the concurrent browsing session and may include scoring items being browsed by weighting user attributes by relevance. For example, if a user in the group would incur the least shipping costs by purchasing an item based on the user's location (i.e., user attribute), then the recommendation engine may generate a recommendation with text indicating that the particular user should purchase the item. The recommendation is displayed on the concurrent browsing interface near the item being recommended. As users provide input and continue to participate in the concurrent browsing session, an updated user interface with recommendations, annotations, and scores is provided for display until the users elect to end the concurrent browsing session.

As an example to illustrate, a user may prefer to shop for outfits with a group of friends for an upcoming wedding. The user may submit a request to initiate a concurrent browsing session with a selected few group of users. As each user joins the concurrent browsing session, each user in the group is able to see the real-time live feed of the browsing screen and activities taking place on the other users' screens. User attributes for each user, such as historical purchases, are retrieved and analyzed to generate recommendations, such as a suggestion that a user purchase a floral dress because many other users in the group purchased floral dresses. The recommendation may be superimposed on the concurrent browsing interface. As the users continue to interact with the interface and leave annotations and scores on items, the other participating users are able to view the feedback on their own screens in real-time. The annotations and scores submitted by the users are, in turn, used to generate recommendations. The updated user interface includes recommendations, annotations, and scores.

While the present technology is presented in the context of recommendation and user interface engines for generating recommendations for a group of users and presenting a concurrent browsing interface, it will be recognized that this is only one example use scenario in which the described technology may be employed. One of ordinary skill in the art will appreciate that the underlying technical methods described herein for generating recommendations for a group of users and providing a concurrent browsing interface to view the screens and browsing activity of multiple users are applicable across many different contexts. It is impractical to describe all of the various contexts in which the technology can be employed. Thus, for simplicity and consistency, the technology will continue to be described in the context of e-commerce.

In view of this, it should become apparent that the technology of this application solves problems that are rooted in and arise from the use of the Internet. Generating recommendations based on a group of users and effectively presenting it along with the real-time feeds of other users' browsing screens and activities is a technological challenge and limitation of the Internet. The use of the Internet is only as good as the ability to provide recommendations from attributes associated with users and present it to multiple users in a concurrent interface.

For example, at the time of filing, for a user to share a search result for "floral dress" entered into an e-commerce website, the user must select a hyperlink of a desired item to share it with other users. To effectively navigate and use the Internet, it is not simply enough to be able to share the details of an item with others. Instead, generating recommendations based on a group of users that a participating user is soliciting feedback from and generating a user interface to capture the browsing activity and display the activity to all users is also essential to the functioning of the Internet and a user's ability to use the Internet to collaborate with others while shopping. Thus, instead of providing a hyperlink to share an item with a user, the user should be able to receive real-time feedback from users that will influence the ultimate purchase of an item, or else it would be impossible for the user to incorporate feedback on selected items from multiple users in real-time.

The technology described herein provides solutions to these problems. For instance, by providing for display an interface that allows each user to see every other participating user's browsing screen and activity, the user interface engine can gather real-time feeds of browsing screens and present them to all of the users in the session as opposed to the user interface engine generating a user interface that merely shows the browsing activity of a single user. Likewise, the recommendation engine can analyze user attributes for each participating user to generate recommendations based on the group as opposed to a recommendation engine that generates recommendations from the user attributes of single user. In doing so, the user interface and recommendation engines provide users with relevant recommendations culled from user attributes of the participating users from one or more various Internet-connected servers, and are able to effectively utilize the Internet. Based on this, the user interface and recommendation engines provide more accurate recommendations with less user input, since users are more likely to be provided with recommendations that are relevant to them. Further, network bandwidth, and overall Internet traffic generally, are reduced, since less data is being transmitted over the network.

Turning now to FIG. 1, FIG. 1 illustrates example concurrent browsing system operating environment 100 in which implementations of the present disclosure may be employed. In particular, FIG. 1 illustrates a high-level architecture of concurrent browsing system operating environment 100 having components in accordance with implementations of the present disclosure. The components and architecture of FIG. 1 are intended as examples, as noted toward the end of Detailed Description.

Among other components or engines not shown, concurrent browsing system operating environment 100 includes client-computing devices 102 and 104. Client-computing devices 102 and 104 are shown communicating using network 106 to recommendation engine 114 and user interface engine 124. The components of concurrent browsing system operating environment 100 may communicate with each other over one or more networks (e.g., public network or virtual private network "VPN") as shown with network 106.

The components of concurrent browsing system operating environment 100 can operate together to provide functionality for providing generating recommendations based on the attributes of multiple users and presenting a user interface with real-time feeds of multiple users' browsing screens incorporating recommendations, examples of which will be further described. Concurrent browsing system operating environment 100 supports processing user input from client-computing devices 102 and 104. In particular, client-computing devices 102 and 104 can receive annotations, browsing activity, and scores, and communicate those forms of user input to recommendation engine 114 through user interface engine 124. Client-computing devices 102 and 104 can also operate with recommendation engine 114 and user interface engine 124 to transmit users' browsing screens and browsing activity and display or cause the display of, all or a portion of, the generated recommendations that may be responsive to user input such as browsing activity, annotations, and scores. User interface engine 124 may receive user input, determine the type of user input received, and route user input to recommendation engine 114. Recommendation engine 114 may receive user input from user interface engine 124, receive user attributes 110 from database 108, process the user input, generate recommendations, and transmit the recommendations to user interface engine 124 for display.

Network 106 may include, without limitation, one or more local area networks (LANs) wide area networks (WANs), or any other communication network or method. Client-computing devices 102 and 104 may be client computing devices that correspond to the computing device described herein with reference to FIG. 5.

Figure 5:
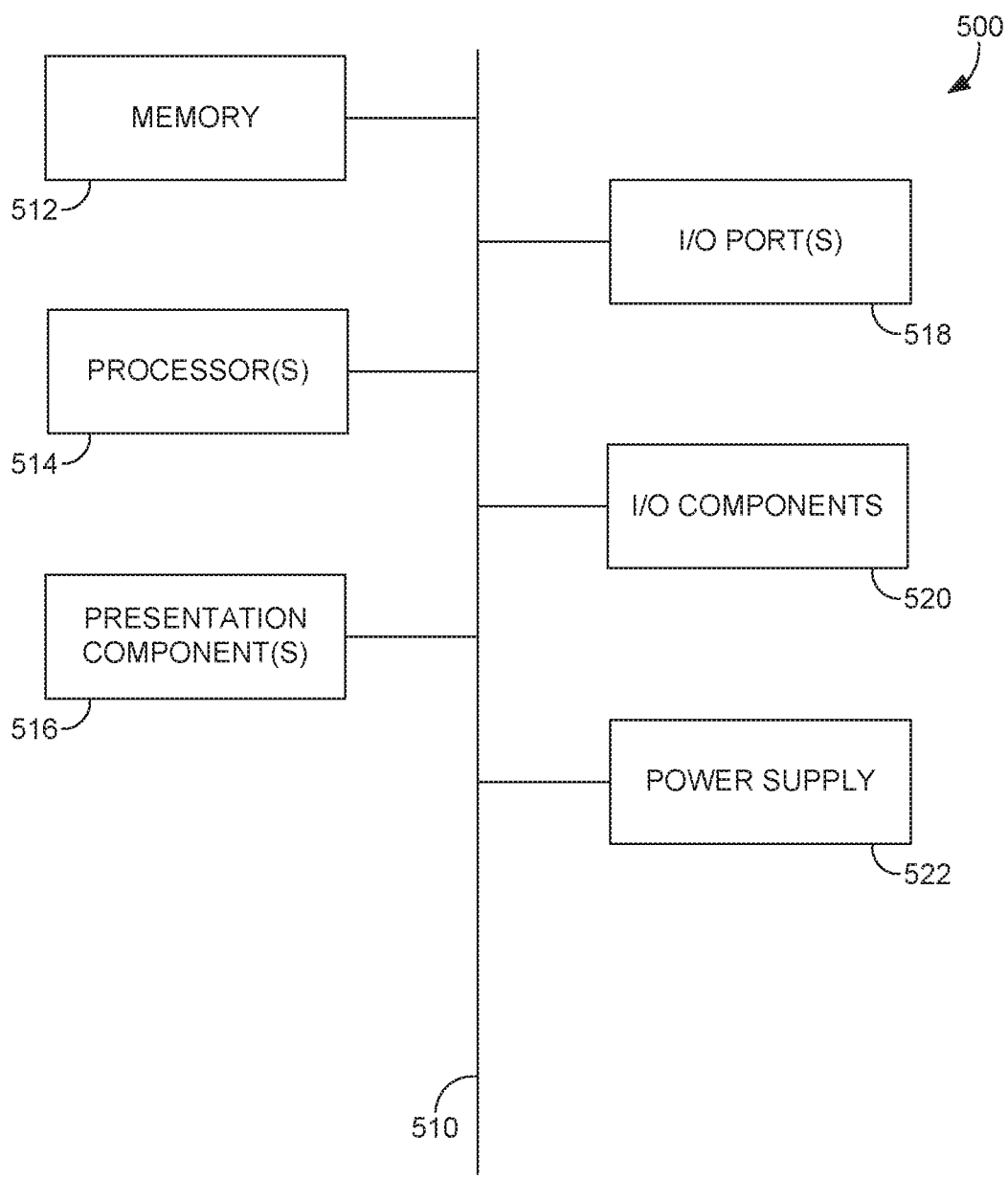
FIG. 5 is a block diagram of an example computing environment suitable for use in implementing aspects described herein.

Database 108 generally stores information including data, computer instructions (e.g., software program instructions, routines, or services), or models used in embodiments of the technical solutions. Although depicted as a database component, database 108 may be embodied as one or more data stores or may be in the cloud. Memory 512 of FIG. 5 is an example suitable for use as database 108. Database 108 stores, among other things, user attributes 110 and payment information 112.

User attributes may be used to identify user-specific data that is unique to the user or represents the user in some way. This may include the user's location (that may be derived using an Internet Protocol address), historical purchases, search queries, browsing activity, feedback (including scores) of items or services, item wish-lists (or other user-generated lists of item), the stated purpose for initiating concurrent browsing sessions, annotations, scores, and other forms of data collected from various sources. For example, user attributes may be received from the user or client-computing devices 102 and 104, such as a user providing preferences or user profile information, a user inputting scores or reviews about an item, or by collecting user Internet cookies or client device information. The user attributes may be used by the recommendation engine 114 to generate recommendations to the users. Additionally, the terms "items" and "products" may be used interchangeably.

A "user" may broadly include any identifiable origin of information. For example, a user may include a person using a computing device, such as client-computing devices 102 and 104. A user may include client-computing devices 102 and 104, itself. In another example, a user may include the network over which client-computing devices 102 or 104 communicates, such as one identified by an Internet Protocol (IP) address. Thus, for example, the user profile may be specific to a particular person, a particular computing device, a specific IP address, or the like, and stored at database 108. In a specific example, a user is a candidate buyer of the goods or services from an e-commerce marketplace website that is participating (or invited to participate) in a concurrent browsing session.

Payment information 112 includes user-specific data that pertains to how a user's methods of payment and associated information to facilitate payment. This may include sensitive financial information such as credit card or debit card information, security codes, expiration dates, billing address, mailing address, and other forms of data collected from various sources. This may also include non-sensitive information such as the user's digital cart, which includes items that the user has selected for potential purchase, but has not yet paid for. For example, payment information may be received from the user or client-computing devices 102 and 104, such as a user providing credit card number to complete a transaction or by collecting user Internet cookies regarding payment methods. The payment information may be used by the recommendation engine 114 to generate a shared payment mechanism.

User interface engine 124 is illustrated as including concurrent browsing interface generator 126, payment interface generator 128, annotation interface generator 130, and recommendation interface generator 132.

User interface engine 124 may receive a request to initiate a concurrent browsing session between multiple users from client-computing devices 102 and 104. User interface engine 124 may also receive user input and browsing activity as users participating in the concurrent browsing session interact with the user interface.

User input, for example, may be any action provided by a user. For instance, the user input may include a mouse click or movement, pressure applied to a touch-screen interface, movement along a smart pad, or any other interaction with device or sensor for receiving and communicating a user action.

Browsing activity, for example, may be user input relative to the objects on the screen. Said differently, browsing activity is the tracking of the user's interactions with the screen. For instance, as users click or move across the screen, the coordinates of the user's actions and the items affected by those actions may be logged as browsing activity. Browsing activity may also include a user's input or actions on the displayed browsing screens of other users.

To initiate a concurrent browsing session, user interface engine 124 may use concurrent browsing interface generator 126. Concurrent browsing interface generator 126 generally renders a graphical user interface ("GUI") that includes real-time live feeds of browsing screens and browsing activity for each participating user. Example GUIs will be discussed with reference to FIGS. 2 and 3. Continuing with FIG. 1, in response a request to initiate a concurrent browsing session, concurrent browsing interface generator 126 may receive and render the real-time feeds of browsing screens and browsing activity of each participating user. In other words, each participating user can view the real-time live feed of every other participating user's browsing screen and browsing activity. The GUI may include a multi-layout screen that illustrates the browsing screen and activity of all participating users in real-time. For instance, the GUI may include a split screen format in which each portion of the screen corresponds to what each participating user is browsing.

The GUI may include various screens such as item landing pages, search results populated in response to search queries, digital cart pages, and payment checkout. In some aspects, the GUI only shows the browsing screen of a user as it pertains to the relevant website that each user is accessing. For example, the real-time browsing screen will only show the website (or related webpages) that all of the participating users are browsing on, not other tabs or applications that may be open on a user's device.

In some cases, a user may select to view some screens as larger than others. For instance, a user may select one screen in the multi-screen layout to view it more closely than the other screens. Put another way, the screens and browsing activity of the participating users are visible to all users and a user may select to view one screen in more detail than the others. Likewise, a subset of browsing screens may be selected to view when the number of participating users is high.

Figure 2:
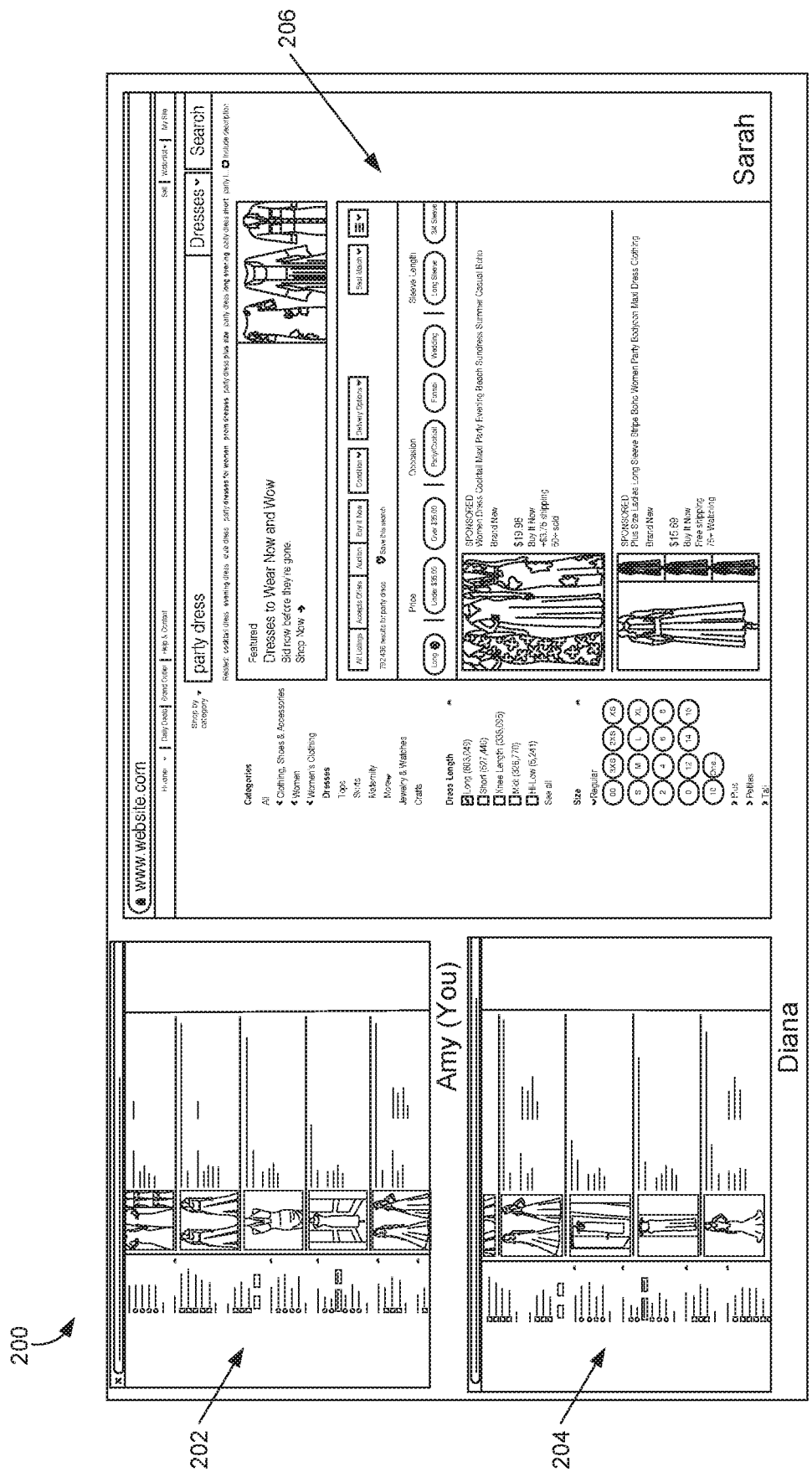
FIG. 2 is an example illustration of a Graphical User Interface ("GUI") having a concurrent browsing interface involving three users, in accordance with aspects described herein.

With reference now to FIG. 2, FIG. 2 provides an example illustration of GUI 200 providing for display multiple browsing screens of several users. GUI 200 includes three browsing screens 202, 204, and 206. Browsing screen 202 is of Amy's open browser screen. In this example, Amy is the user that is viewing the GUI on her device, as indicated with the placement of "(You)" next to the name Amy. Diana's browsing screen 204 and Sarah's browsing screen 206 are both shown as well in the multi-screen GUI layout. Each of the browsing screens 202, 204, and 206 displays the movements and actions of each respective user simultaneously. Said differently, as each user interacts with the user interface and moves their cursor over their screen to click on elements and navigate to different webpages, all of the other participating can view the movements of the user respective to their screen. For example, Amy's browsing screen 202 displays different items in comparison to the other two browsing screens 204 and 206. Sarah's browsing screen 206, as illustrated, is larger than the other two screens as a result of Amy selecting to view Sarah's browsing screen 206 in greater detail. However, Amy may select browsing screens 202 or 204 to view those screen as larger than the remaining screens.

Turning back to FIG. 1, in some aspects, the concurrent browsing interface generator 126 may receive and display video streams from participating users alongside with the displayed browsing screens. For instance, the live video stream may involve augmented reality for users to view whether browsed items are suitable. In this way, the users are able to see each other via video and determine whether to purchase an item. For example, one user browsing a dress may "try on" the dress using augmented reality and a live video stream. With the user being displayed via live video stream, the augmented reality functionality may superimpose the dress on the user to show how the dress would look on the user.

Concurrent browsing interface generator 126 may be configured to generate a GUI that is interactive and may be manipulated in response to user input. Said differently, the user may interact with the GUI to change the displayed features across the multi-screen layout GUI for all users. For instance, the concurrent browsing interface generator 126 may accept search queries from each user participating in the concurrent browsing session in the form of images and use a live video stream to scan images, video image frames, barcodes, and/or text. In some aspects, the search results generated from the live video stream may be presented in a separate GUI panel. The GUI panel may present the search results such that users are able to capture a live video stream frame and request generation of search results from that video frame. Likewise, the concurrent browsing interface generator 126 may be configured to allow users to navigate to other webpages of a website, such as payment or checkout webpages, item landing webpages, and digital cart webpages.

Concurrent browsing interface generator 126 may also be configured to determine the different types of user input and route the input to the recommendation engine 114 as necessary. In other words, the concurrent browsing interface generator 126 may receive user input as the user interacts with the GUI and determine whether the user input is an annotation or score. In both instances, the concurrent browsing interface generator 126 may route those types of user input to the recommendation engine 114 for processing. Likewise, the concurrent browsing interface generator 126 may consider search queries to be user attributes and route this information to the recommendation engine 114 accordingly. Additionally, the concurrent browsing interface generator may determine whether the user or group of users have selected to end the concurrent browsing session. In some instances, when a request to end the concurrent browsing session is received, the concurrent browsing interface generator 126 prompts the users to select whether the save a recording or event log of the session.

To provide for display annotations during a concurrent browsing session, user interface engine 124 may use annotation interface generator 130. Annotation interface generator 130 generally renders a GUI that incorporates annotations received from users onto each user's screen. Annotation interface generator 130 may accept user input, such as text, emoticons, or images, submitted with respect to the other users' screens.

Annotations are provided by the users participating in the concurrent browsing session and allow the users to provide feedback on any other user's screen while browsing. Annotations may include text, emoticons, browsing activity, actions related to payment (such as adding an item to the digital cart), and scores. For instance, if one user is viewing search results responsive to the search query "dress," then another user may provide additional feedback, such as comments, on the real-time feed of the first user's screen. The annotations may be used by the recommendation engine 114 to generate recommendations to the users on the content of the annotations. For instance, the recommendation engine 114 may separately analyze a text annotation of "I love this" and increase the score value for the item that the annotation pertains to.

Annotations may be received via user input from client-computing devices 102 and 104. For example, if one user comments on another user's browsing screen, all of the other users participating in the concurrent browsing session would view the annotation in the same position that the commenting user placed it on the particular browsing screen. In some aspects, the annotation interface generator 130 may overlay or superimpose received annotations onto the concurrent browsing interface that displays each user's browsing activity in real-time. Additionally, the annotation interface generator 130 may record the placement of the annotation using the coordinates of browsing activity to determine where to place annotations in the concurrent browsing session viewed by other users.

Figure 3:
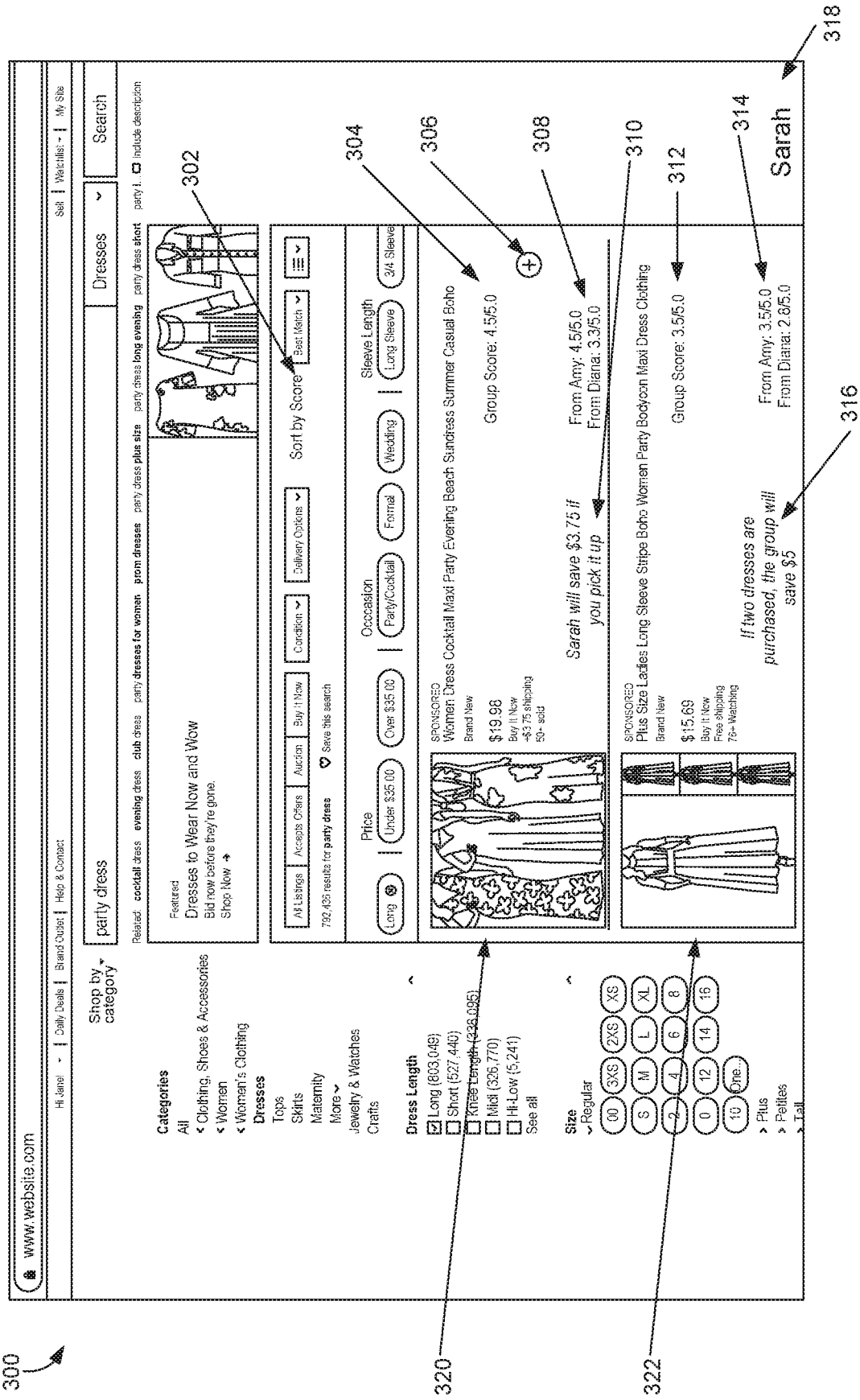
FIG. 3 is an example illustration of a GUI having a concurrent browsing interface with annotations and recommendations, in accordance with aspects described herein.

With brief reference to FIG. 3, example concurrent browsing user interface 300 is provided. FIG. 3 illustrates that annotations, such as user scores 308 and 314, are placed relative to the items they correspond to. Likewise, the "+" annotation button 306 allows users to place annotations near items that the annotations correspond to.

Returning to FIG. 1, payment interface generator 128 generally renders a GUI for users to view, share, and split payment. The payment interface generator 128 may generate a payment interface in response to at least one user navigating to a webpage that is payment-related. For instance, a user selecting to view their digital cart, adding an item to the digital cart, or proceeding to the checkout page may cause the payment interface generator 128 to generate a payment interface that allows the users to share the cost of items selected for purchase. The payment interface generator 128 may also receive user input or annotations related to the payment of items or the selection of items for payment. For instance, if one user, named Amy, clicks to add an item displayed on another user's (Sarah's) browsing screen to their digital cart, then the payment interface generator 128 may generate a payment interface that reflects the item was added into the Amy's digital cart.

Payment interface generator 128 may receive aggregated payment information from users to display in the payment interface. The payment interface may be a multi-screen layout that splits the screen to show each user's digital carts and real-time browsing activity. In some aspects, the payment interface may be one screen with all of the digital carts of each user displayed. With all of the items selected for purchase displayed, the users may elect to split payment of selected items through the GUI. In some aspects, the users may split the costs of an entire digital cart.

In some aspects, the aggregated payment information included in the payment interface may be pre-screened to remove any sensitive financial information. The aggregated payment information may also be displayed such that each user only views their own sensitive financial information. For instance, the GUI may display each user's digital cart including the items and prices each user has selected to all users, but each user may view only their own respective sensitive information such as billing address and credit card information.

Recommendation interface generator 132 generally renders a GUI for users to view recommendations with respect to items being browsed or payment of those items. Recommendation interface generator 132 may receive recommendations regarding browsed items, wish-lists, digital carts, and shared payment. Each user views the recommendations placed on the other users' screens as well as the recommendations placed on their own. In some aspects, the received recommendations are superimposed or overlaid on any combination of concurrent browsing interface, payment interface, and annotation interface. For instance, the recommendation may be displayed on a concurrent browsing interface with superimposed annotations and scores. The recommendation may be displayed to only one user that the recommendation applies to or it may be displayed to all users.

The recommendations may be placed relative to other annotations and scores present on the GUI to ensure the recommendation is aligned with the related item. In some aspects, the recommendation interface generator 132 provides for display items in an order sorted by generated score.

With brief reference to FIG. 3, FIG. 3 illustrates that recommendation 310, which suggests that the user viewing the browsing screen purchasing the item 320 will Sarah $3.75 in shipping costs, is overlaid over a GUI displaying annotations such as group scores 304 and 312 user scores 308 and 314. Likewise, recommendation 316 is placed relative to the item 320, the floral dress, that it is associated with.

Recommendation engine 114 is illustrated as including user attribute receiver 116, score generator 118, shared payment generator 120, and recommendation generator 122. Recommendation engine 114 may operate with user interface engine 124 to receive and process user input, such as updated browsing activity and search queries, to generate and provide for display recommendations.

User attribute receiver 116 generally receives user attributes that have been identified by recommendation engine 114 in response the initiation of a concurrent browsing session and in response to user input (such as clicking on an item or submitting a search query). To retrieve user attributes, user attribute receiver 116 may identify the users currently in a concurrent browsing session and retrieve the user attributes identified by the recommendation engine 114 from user attributes 110 in database 108. For instance, if the recommendation engine 114 requests a specific recommendation for a group of identified users, such as a recommendation to reduce shipping costs, the user attribute receiver 116 may retrieve the locations, which is related to the recommendation, of all of the users in the concurrent browsing session from user attributes 110 in database 108. The retrieved locations may be used by recommendation engine 114 to calculate the user with the lowest shipping costs for a particular item.

Turning briefly to FIG. 3, example concurrent browsing interface 300 is provided. Annotation button 306 provides an example of mechanism users may use to provide annotations or feedback by clicking on the "+" button on the user interface. As shown by the label "Sarah" 318, the displayed browsing screen shows browsing activity from a user named Sarah. For instance, when the viewing user, who is not Sarah, selects the "+" button, the user is presented with the choice to input text and/or emoticons related to the item 320 on Sarah's browsing screen 300. Likewise, selecting the "+" button may allow a user to add a manual score for an item that another user is viewing.

With reference again to FIG. 1, score generator 118 generally generates scores for items being browsed by the users in the concurrent browsing session. Score generator 118 may calculate scores for items based on the user attributes of the users participating in the concurrent browsing session and the purpose of the concurrent browsing session. These scores may be calculated for items in various sources: browsing screens, search results, wish-lists, and digital carts.

The score generator 118 may generate two types of scores: group scores and user scores. Group scores are generated by the score generator based on the user attributes of all of the users participating in the concurrent browsing session. For example, the user attributes of the participating users, such as historical purchases, may be retrieved and used to generate a score for a current item. If an item was previously purchased by other users and highly rated, then the score generator 118 may generate a high group score for the item. User scores are generated based on input from participating users and are displayed as corresponding to a particular user. The scores may be input by the participating users through client-computing devices 102 and 104 during the concurrent browsing session. For instance, one user may provide feedback on another user's browsing screen by providing a numerical score with respect to an item. The scores may also be previously input by the participating users prior to the concurrent browsing session. For instance, if a user's search results include a prior purchase from another user and the user had previously provided a score for the item as a review, then the score generator 118 may retrieve the prior score input by the other user.

By way of example, if the concurrent browsing session was initiated for the users to "shop for dresses," then the score generator 118 may evaluate user attributes, such as historical purchases, for the users participating in the session to generate scores for one user's search query of "dress." If the user attributes for most of the users participating in the session indicate the users favor floral dresses, the score generator 118 may generate a higher score for search results that include floral dresses. Those search results that are less aligned with the purpose of the concurrent browsing session may by scored lower. For instance, if the purpose of the concurrent browsing session is to shop for clothes for a party, search results including clothing items designated as appropriate for a party may receive a higher score than search results included clothing items designated as casual. Similarly, the purpose of the concurrent browsing session may include details regarding the relationship between the participating users and score search results accordingly. For example, the purpose of the concurrent browsing session may indicate that the users are in a romantic relationship and may score as higher clothing items with complimentary or coordinating color schemes. Likewise, search results that are disfavored by the group based on user attributes, such as historical purchases, may receive a lower score.

Turning briefly to FIG. 3, FIG. 3 is an example concurrent user interface with three users participating: Sarah, Amy, and Diana. Browsing screen 300 illustrates the browsing screen and activity of Sarah. Group scores 304 and 312 and user scores 308 and 314 provide examples of scores. Group scores 304 and 312 are generated by the score generator based on the user attributes of all three users participating in the concurrent browsing session. In this example, the user attributes of Amy, Diana, and Sarah indicate that all of the users have previously purchased a floral dress, but have not purchased a striped dress. The score generator 118 provides a higher group score 304 for item 320, which is a floral dress, compared to the group score 312 for item 322, which is a striped dress. User scores 308 and 314 were generated when Amy and Diana manually input scores for each of the dresses.

Turning back to FIG. 1, shared payment generator 120 generally generates a payment system that incorporates payment information from all of the participating users, including the items in each user's digital cart. To retrieve payment information, shared payment generator 120 may identify the users currently in a concurrent browsing session and retrieve and aggregate the payment information identified by the recommendation engine 114 from payment information 112 in database 108. The aggregated payment information may be partly obfuscated or removed so as to not disclose sensitive financial information such as credit card numbers in the user interface, but provide digital cart totals. The shared payment generator 120 may also receive user input or annotations, such as a user selecting an item to add to their digital cart, and update payment information 112 in database 108 to reflect that a particular user has added an item into their digital cart.

In some aspects, the shared payment generator 120 selects the information that will be provided for display to each user. For example, for a given user, the shared payment generator 120 may gather, for display to the user, digital cart information for all of the other users along with the given user's payment methods. In that way, a particular user's financial information is visible on only that user's screen and is hidden from view from other users, but the user is still able to view the digital carts of other users.

The shared payment generator 120 may also provide users with a mechanism to split payment. For instance, the shared payment generator 120 may calculate the total digital cart amount when three users agree to split the cost of one item in one user's digital cart. In some aspects, the shared payment generator 120 allows users to split payment for an entire digital cart. The shared payment generator 120 operates with user interface engine 124 to generate a user interface for shared payment between participating users.

Turning back to FIG. 1, recommendation generator 122 generally generates recommendations based on the user attributes of the users involved in the concurrent browsing session. Recommendations may include any suggestion relating to the purchase of items or services. Recommendation generator 122 may distinguish aspects of user attributes and apply a weight to those aspects indicating a relevance to generated recommendations. For instance, recommendation generator 122 may receive user attributes, such as a search query, for one user participating in the current concurrent browsing session and determine other users' historical purchases that are responsive to the search query. Those historical purchases of other users may be recommended to the user that input the relevant search query as a possible purchase. The search query may be input from the user or client-computing devices 102 and 104 in a variety of forms. For example, a user may upload an image, such as a dress that may be of interest to another user, as a search query to populate search results. Users may also scan a barcode or use a frame of a live video stream as other forms of search queries.

The recommendation generator 122 may further use other user attributes such as browsing activity and payment information to provide other recommendations such as which user should purchase an item to minimize shipping cost or promotions that would apply if certain users purchased an item. For instance, recommendation generator 122 may receive user attributes, such as multiple users in the concurrent browsing session clicking on links for purses and each user having a purse in their digital cart, and determine that purses are of relevance to all of the participating users. The recommendation generator 122 may determine that there is a promotional discount for the purchase of multiple purses. Continuing with the example, the recommendation to the users may be a promotion for a discount when a certain number of purses is purchased. The recommendation may also include that one user purchase all of the purses to obtain the bulk purchase discount.

The recommendation generator 122 may also use additional user attributes, such as location and the stated purpose of the concurrent browsing session, to provide recommendations. For instance, the recommendation generator 122 receives the locations of users and may recommend that one user, whose location will result in the least amount of shipping costs, purchase an item. In some aspects, the location of each user is derived from an IP address. Recommendation generator 122 may also receive users' locations and the stated purpose of the concurrent browsing session to recommend which user purchase an item. For example, if the stated purpose of the concurrent browsing session is to shop for dresses for an upcoming wedding taking place in Los Angeles, the recommendation generator 122 may recommend that one user with the least shipping costs purchase the items that can then be distributed during the event, thereby reducing shipping costs for users in locations resulting in higher shipping costs. Recommendation generator 122 may also use the user's location to recommend items based on the particular features of the location. For instance, if the users are browsing for jackets during winter and one user lives in a warm climate while the other users live in a colder climate, recommendation generator 122 may recommend that the user in the warm climate purchase a lighter winter jacket and that the other users purchase a heavier winter coat. Likewise, if the purpose of the concurrent browsing session indicates that the user in warmer climate is planning to visit the user in the colder climate during winter, then the recommendation generator 122 may recommend that the users purchase heavier winter jackets versus light winter jackets.

Turning briefly to FIG. 3, recommendation 310 provides an example of the recommending a user purchase an item to save on shipping costs. As illustrated in FIG. 3, recommendation 310 states that the user viewing the item should purchase the item in order to save Sarah $3.75 in shipping costs. In this example, the recommendation 310 was generated based on the locations of each user and associated shipping costs.

The recommendation generator 122 may also use other user attributes such as historical purchases and search terms to provide other recommendations. For instance, recommendation generator 122 may receive user attributes, such as search queries from users and each user's historical purchases, and determine that items to suggest to a user based on the list of historical purchases. For example, the recommendation generator 122 may receive a search query of "floral dress" from a particular user and any associated search results. The recommendation generator 122 may compare the list of search results with historical purchases from the other users to find items associated with both the search results and historical purchases to recommend. The recommendation generator 122 may also search each user's historical purchases with the first user's search query to determine other historical purchases that may be associated. For any items associated with historical purchases and the search query, the recommendation generator 122 may generate a recommendation for users to purchase the item.

In some aspects, the recommendation generator 122 may compare the search results from search terms of two different users in the group to identify common items. Based on the identified items, the recommendation generator 122 may further determine whether a promotion applies to the items and recommend the users take advantage of the promotion. For example, if one user searches "red purse" and another user searches "large purse," then the recommendation generator 122 may identify search results that exist both sets of search results and identify that a promotion currently applies for purchases of two or more of the same item. Continuing with the example, the recommendation generator 122 may generate a recommendation that the participating users purchase that item to obtain the bulk discount.

Turning briefly to FIG. 3, recommendation 316 provides an example of the recommending users purchase multiple items to obtain a discount. As illustrated in FIG. 3, recommendation 316 states that the group will $5 if two dresses are purchased. In this example, the recommendation 310 was generated based on the search results of multiple users' browsing screens include an item that with an applicable discount.

Recommendation generator 122 may also use user attributes such as scores to generate recommendations. The recommendation generator 122 may retrieve scores from score generator 118 to generate recommendations. For instance, the recommendation generator 122 may receive a score for each search result presented in response to a search query. With the received scores for each item, the recommendation generator 122 may sort the items based on scores as a recommendation of which items to purchase. The sorting of items based on score may take place in a variety of areas: search results, digital carts, wish-lists, among other areas.

Turning briefly to FIG. 3, the "sort by score" icon 302 provides an example of the sorting of displayed items. As illustrated in FIG. 3, each item has a group score, such group scores 304 and 312, and user score, such as user scores 308 and 314. The "sort by score" icon 302 allows users to sort the displayed items by the group scores and user scores. The sorting may be done in ascending or descending order.

The recommendations generated by recommendation generator 122 may be in a variety of forms: text, emoticons, audio, among other types of media. Once the recommendation is generated, the recommendations are provided for display to the user via the user interface engine 124.

Turning back to FIG. 1, recommendation generator 122 operates with user interface engine 124 to provide for display the recommendations to client-computing devices 102 and 104.

It will be understood that the components of the recommendation engine 114 and user interface engine 124 may be discrete algorithms or models. However, as noted, components of recommendation engine 114 and user interface engine 124 are described as discrete components to aide in describing the technology. Although in other embodiments intended by this disclosure, the functions of these components may overlap or be further divided. Thus, it will also be understood that other embodiments of the technology include a combined implementation of these components. For instance, the recommendation interface generator may be a modification to the concurrent browsing interface generator (a modified concurrent browsing interface generator) that incorporates recommendations into the concurrent browsing interface. In such cases, the modified concurrent browsing interface generator can generate and provide for display a user interface with a multi-screen layout with incorporated recommendations. While the disclosure describes these (and other) components separately, it is intended that this also includes modified or combined implementations of these components. That is, for example, where functions are separately described as "generating a concurrent browsing interface" and "generating a recommendation interface," it is intended that these separately disclosed steps also include a single action of generating a concurrent browsing interface with recommendations incorporated by a modified concurrent browsing interface generator.

Methods may be performed using the concurrent browsing system described herein. In embodiments, one or more computer storage media having computer-executable instructions embodied thereon that, when executed, by one or more processors, cause the one or more processors to perform the methods in the search system.

Figure 4:
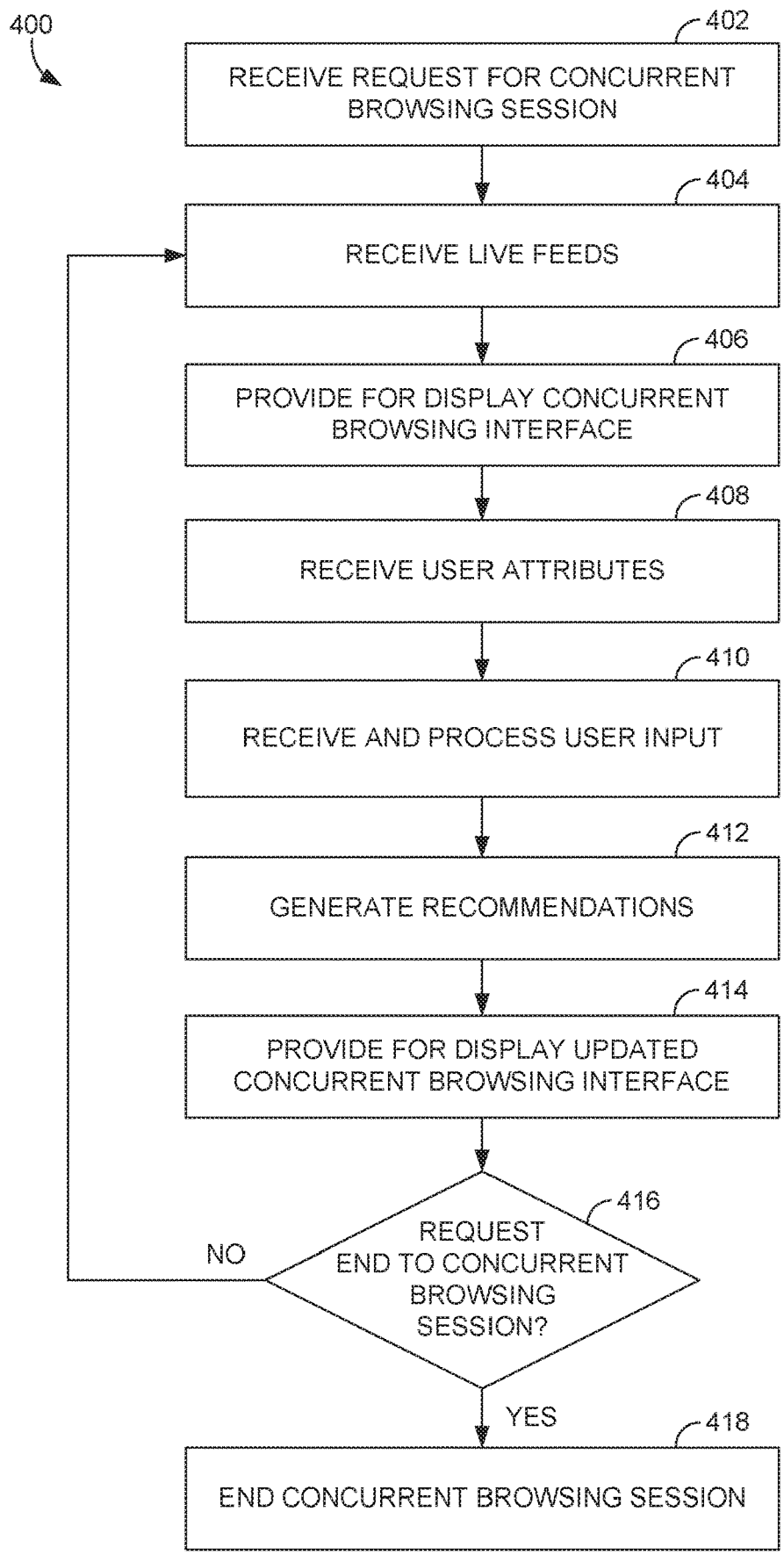
FIG. 4 is a block diagrams illustrating an example method for presenting a concurrent browsing interface with generated recommendations, in accordance with aspects described herein.

One example for generating a user interface with recommendations, annotations and scores is illustrated by method 400 of FIG. 4. At block 402, a request to initiate a concurrent browsing session is received through the user interface engine and is routed to the recommendation engine. The request is received from a client-computing device. The client-computing device may be remote from the user interface and recommendation engines, or may host all of or a portion of the engines. In either aspect, the user interface engine receives the request from the client-computing device. In some aspects, the request may include a purpose or reason for the concurrent browsing session that is used to generate recommendations. For instance, the specified purpose may be to "shop for a wedding in Los Angeles in spring 2020." At block 404, real-time live feeds of the user's browsing screens reflecting the browsing activity of each participating user are received. At block 406, a concurrent browsing interface is generated and provided for display. The concurrent browsing interface can be generated using a concurrent browsing interface generator. Concurrent browsing interface generator 126 of FIG. 1 is an example concurrent browsing interface generator that can be used by the method.

At block 408, user attributes are received. The user attributes of the participating users can be received using a user attribute receiver. User attribute receiver 116 of FIG. 1 is an example user attribute receiver that can be used by the method. By receiving the user attributes, the recommendation engine 114 of FIG. 1 can determine recommendations. At block 410, any received user input is processed. Concurrent browsing interface generator 126 of FIG. 1 is an example user input processor that can be used by the method. The concurrent browsing interface can determine the type of user input submitted and route the input accordingly. For instance, the user inputting an emoticon may be determined to be an annotation and routed to recommendation engine 114 and to other components of user interface engine 124. Components of the recommendation engine 114, such as the score generator 118 and shared payment generator 120, may process received user input. For example, if user input has been identified as an annotation, score, or browsing activity, the score generator 118 may retrieve user attributes, receive the user input, and process the values to generate a score. Similarly, if user input involves a request for a shared payment interface or navigation to payment-related content, the shared payment generator 120 may retrieve payment information 112 and user attributes 110 and obfuscate sensitive financial information for display via the payment interface, as generated by user interface engine 124.

At block 412, recommendations are generated. The recommendation can be generator using a recommendation generator. Recommendation generator 122 of FIG. 1 is an example recommendation generator that can be used by the method. By receiving the user attributes, annotations, scores, and browsing activity, the recommendation engine 114 of FIG. 1 can generate recommendations. Recommendations may range from suggestions of promotions to which items to purchase to which users should purchase particular items.

At block 414, an updated concurrent browsing interface is provided for display. Payment interface generator 128, annotation interface generator 130, and recommendation interface generator 132 of FIG. 1 are example interface generators suitable for use by the method. The payment interface generator 128 generates a shared payment interface such as a multi-screen layout of digital carts, an aggregated digital cart, and mechanisms for splitting payment. The annotation interface generator 130 generates an annotation interface that includes the annotations submitted by users participating in the concurrent browsing session such that each user can view the annotation relative to the item that it was placed next to. The recommendation interface generator 132 generates a recommendation interface such that each user may view recommendations in addition to live real-time feeds of each user's browsing screen and activity.

As shown in block 416, a decision point regarding whether a request to end the concurrent browsing session is evaluated. If a request to end the concurrent browsing session is received, block 418 is performed next. If a request to end the concurrent browsing session is not received, then block 404 is performed.

At block 418, the concurrent browsing session is ended. The concurrent browsing interface generator may prompt the user to select whether the save a recording or event log of the session.

Having described an overview of embodiments of the present technology, an example operating environment in which embodiments of the present technology may be implemented is described below in order to provide a general context for various aspects. Referring initially to FIG. 5, in particular, an example operating environment for implementing embodiments of the present technology is shown and designated generally as computing device 500. Computing device 500 is but one example of a suitable computing environment and is not intended to suggest any limitation as to the scope of use or functionality of the technology. Neither should computing device 500 be interpreted as having any dependency or requirement relating to any one or combination of components illustrated.

The technology of the present disclosure may be described in the general context of computer code or machine-usable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrates an example computing device that can be used in connection with one or more embodiments of the present technology. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile or nonvolatile memory. The memory may be removable, non-removable, or a combination thereof. Example hardware devices include solid-state memory, hard drives, optical-disc drives, etc. Computing device 500 includes one or more processors that read data from various entities such as memory 512 or I/O components 520. Presentation component(s) 516 present data indications to a user or other device. Examples of presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

The distributed computing environment depicted herein is merely an example. Components can be configured for performing novel aspects of the technology, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A computer-implemented method comprising:
providing, for display on a first computing device of a first user, a user interface configured to simultaneously display a first browsing screen showing interaction of the first user with a site and a real-time feed of a second browsing screen presented on a second computing device of a second user showing interaction of the second user with the site;
adding a first item to a first digital cart associated with the first user in response to input indicative of the first user selecting the first item from the real-time feed of the second browsing screen;
receiving a request to split payment of the first item in the first digital cart;
providing, for display on the first computing device, a first payment interface for a first portion of the payment; and
providing, for display on the second computing device, a second payment interface for a second portion of the payment.

2. The method of claim 1, wherein the first digital cart comprises a shared digital cart provided for display on the first computing device and the second computing device.

3. The method of claim 2, wherein the first digital cart includes a second item added to the first digital cart by the second user.

4. The method of claim 1, wherein the request to split payment of the first item in the first digital cart comprises a request to split payment of all items in the first digital cart.

5. The method of claim 1, wherein the method further comprises:
providing a further user interface for presenting simultaneously the first digital cart associated with the first user and a second digital cart associated with the second user, wherein the first digital cart comprises one or more items added by the first user and the second digital cart comprises one or more items added by the second user.

6. One or more computer storage media having computer-executable instructions embodied thereon that, when executed by one or more processors, cause the one or more processors to perform operations comprising:
providing, for display on a first computing device of a first user, a user interface configured to simultaneously display a first browsing screen showing interaction of the first user with a site and a real-time feed of a second browsing screen presented on a second computing device of a second user showing interaction of the second user with the site;
adding a first item to a first digital cart associated with the first user in response to input indicative of the first user selecting the first item from the real-time feed of the second browsing screen;
receiving a request to split payment of the first item in the first digital cart;
providing, for display on the first computing device, a first payment interface for a first portion of the payment; and
providing, for display on the second computing device, a second payment interface for a second portion of the payment.

7. The one or more computer storage media of claim 6, wherein the first digital cart comprises a shared digital cart provided for display on the first computing device and the second computing device.

8. The one or more computer storage media of claim 7, wherein the first digital cart includes a second item added to the first digital cart by the second user.

9. The one or more computer storage media of claim 6, wherein the request to split payment of the first item in the first digital cart comprises a request to split payment of all items in the first digital cart.

10. The one or more computer storage media of claim 6, wherein the operations further comprise:
providing a further user interface for presenting simultaneously the first digital cart associated with the first user and a second digital cart associated with the second user, wherein the first digital cart comprises one or more items added by the first user and the second digital cart comprises one or more items added by the second user.

11. A system comprising:
one or more processors; and
one or more computer storage media storing computer-useable instructions that, when used by the one or more processors, cause the one or more processors to perform operations comprising:
providing, for display on a first computing device of a first user, a user interface configured to simultaneously display a first browsing screen showing interaction of the first user with a site and a real-time feed of a second browsing screen presented on a second computing device of a second user showing interaction of the second user with the site;
adding a first item to a first digital cart associated with the first user in response to input indicative of the first user selecting the first item from the real-time feed of the second browsing screen;

receiving a request to split payment of the first item in the first digital cart;

providing, for display on the first computing device, a first payment interface for a first portion of the payment; and providing, for display on the second computing device, a second payment interface for a second portion of the payment.

12. The system of claim 11, wherein the first digital cart comprises a shared digital cart provided for display on the first computing device and the second computing device.

13. The system of claim 12, wherein the first digital cart includes a second item added to the first digital cart by the second user.

14. The system of claim 11, wherein the request to split payment of the first item in the first digital cart comprises a request to split payment of all items in the first digital cart.

* * * * *